US012243509B2

(12) United States Patent
Wang et al.

(10) Patent No.: US 12,243,509 B2
(45) Date of Patent: Mar. 4, 2025

(54) ACTIVE NOISE REDUCTION SYSTEM

(71) Applicant: HONDA MOTOR CO., LTD., Tokyo (JP)

(72) Inventors: Xun Wang, Saitama (JP); Toshio Inoue, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 257 days.

(21) Appl. No.: 18/176,771

(22) Filed: Mar. 1, 2023

(65) Prior Publication Data

US 2023/0317050 A1 Oct. 5, 2023

(30) Foreign Application Priority Data

Mar. 30, 2022 (JP) ................................ 2022-055879

(51) Int. Cl.
*G10K 11/178* (2006.01)

(52) U.S. Cl.
CPC .. *G10K 11/17883* (2018.01); *G10K 11/17817* (2018.01); *G10K 11/17854* (2018.01); *G10K 2210/1282* (2013.01); *G10K 2210/3055* (2013.01); *G10K 2210/3221* (2013.01)

(58) Field of Classification Search
CPC ..... G10K 11/17817; G10K 2210/1282; G10K 2210/3055; G10K 2210/3221
See application file for complete search history.

(56) References Cited

U.S. PATENT DOCUMENTS 11,238,841 B2 2/2022 Wang et al.
2019/0080681 A1 * 3/2019 Hayashi ........... G10K 11/17883

FOREIGN PATENT DOCUMENTS

JP 2021162849 A 10/2021

* cited by examiner

*Primary Examiner* — Ping Lee
(74) *Attorney, Agent, or Firm* — Armstrong Teasdale LLP

(57) ABSTRACT

An active noise reduction system reduces a noise in an internal space of a mobile body. The active noise reduction system includes a controller configured to control a canceling sound output device. The controller is configured to generate a first canceling estimation signal as an estimation signal of a canceling sound at a position of an error detector based on a reference signal, generate a second canceling estimation signal as an estimation signal of the canceling sound at a head position of an occupant by adjusting a time delay and an amplitude of the first canceling estimation signal based on a reference distance, and update a control filter for controlling the canceling sound output device based on the second canceling estimation signal.

7 Claims, 6 Drawing Sheets

*Fig.6*

T

| reference distance: $L_r$ (cm) | correction coefficient: b |
|---|---|
| 5 | b1 |
| 10 | b2 |
| ... | ... |

ACTIVE NOISE REDUCTION SYSTEM

TECHNICAL FIELD

The present invention relates to an active noise reduction system that reduces a noise by causing a canceling sound in an opposite phase to the noise to interfere with the noise.

BACKGROUND ART

Conventionally, an active noise reduction system reduces a noise by causing a canceling sound in an opposite phase to the noise to interfere with the noise. For example, the active noise reduction system includes a canceling sound output device configured to output the canceling sound for canceling the noise, an error detector configured to detect an error between the noise and the canceling sound and generate an error signal corresponding to the error, and a controller configured to control the canceling sound output device based on the error signal.

For example, JP2021-162849A discloses a speaker that outputs a canceling sound, a microphone that outputs an error signal, and an active noise controller that generates a control signal for causing the speaker to output the canceling sound based on the error signal.

In the conventional active noise reduction system, an area with a high control effect (high noise reduction effect) is limited to a portion of an area around the error detector such as a microphone. Accordingly, if a head position of an occupant changes, the noise at the head position of the occupant may not be reduced sufficiently.

SUMMARY OF THE INVENTION

In view of the above background, an object of the present invention is to provide an inexpensive active noise reduction system that can effectively reduce the noise at a head position of an occupant even if the head position of the occupant changes.

To achieve such an object, one aspect of the present invention provides an active noise reduction system (11) for reducing a noise in an internal space (5) of a mobile body (1), the active noise reduction system comprising: a reference signal generator (12) configured to generate a reference signal corresponding to the noise; a canceling sound output device (13) configured to output a canceling sound for canceling the noise; an error detector (14) configured to detect an error between the noise and the canceling sound and generate an error signal corresponding to the error; a reference distance detector (15) configured to detect a reference distance that is a distance from the canceling sound output device to a head position of an occupant; and a controller (16) configured to control the canceling sound output device based on the reference signal, the error signal, and the reference distance, wherein the controller is configured to: generate a first canceling estimation signal based on the reference signal, the first canceling estimation signal being an estimation signal of the canceling sound at a position of the error detector; generate a second canceling estimation signal by adjusting a time delay and an amplitude of the first canceling estimation signal based on the reference distance, the second canceling estimation signal being an estimation signal of the canceling sound at the head position of the occupant; and update a control filter (W) based on the second canceling estimation signal, the control filter being a filter for controlling the canceling sound output device.

According to this aspect, by updating the control filter based on the second canceling estimation signal (an estimation signal of the canceling sound at the head position of the occupant), the characteristics of the control filter can be changed so as to follow the change in the head position of the occupant. Accordingly, even if the head position of the occupant changes, the noise at the head position of the occupant can be reduced effectively. Further, the second canceling estimation signal is generated by adjusting the time delay and the amplitude of the first canceling estimation signal (an estimation signal of the canceling sound at the position of the error detector). Accordingly, it is not necessary to use a filter with a high calculation load to generate the second canceling estimation signal. Accordingly, the calculation load of the controller can be reduced, and the controller can be composed of a relatively inexpensive processor.

In the above aspect, preferably, the controller is configured to: set a correction coefficient corresponding to the reference distance; and correct an update amount of the control filter by multiplying the update amount of the control filter by the correction coefficient.

According to this aspect, the update amount of the control filter can be adjusted according to the reference distance, so that the update amount of the control filter can be maintained at an appropriate value.

In the above aspect, preferably, the controller is configured to adjust the amplitude of the first canceling estimation signal by using an amplitude adjustment coefficient that decreases as the reference distance increases, and the correction coefficient is set to a reciprocal of the amplitude adjustment coefficient.

According to this aspect, the correction coefficient can be increased in a case where the amplitude adjustment coefficient decreases as the reference distance increases. Accordingly, the update amount of the control filter can be prevented from decreasing excessively, so that the update performance of the control filter can be maintained.

In the above aspect, preferably, the controller is configured to adjust the amplitude of the first canceling estimation signal by using an amplitude adjustment coefficient that decreases as the reference distance increases, and the correction coefficient is set such that a product of the amplitude adjustment coefficient and the correction coefficient is less than 1.

According to this aspect, in a case where the update accuracy of the control filter decreases as the reference distance increases, an excessive increase in the update amount of the control filter can be suppressed. Accordingly, it is possible to avoid a situation in which the performance of the control filter deteriorates due to the update of the control filter.

In the above aspect, preferably, the controller is configured to store a correction coefficient table that defines a relationship between the reference distance and the correction coefficient.

According to this aspect, since the correction coefficient can be freely set according to the reference distance, the degree of freedom in setting the correction coefficient can be enhanced.

In the above aspect, preferably, the controller is configured to: update an estimation value of transmission characteristics of the canceling sound; and generate the first canceling estimation signal by correcting the reference signal based on the updated estimation value of the transmission characteristics of the canceling sound.

According to this aspect, in a case where the transmission characteristics of the canceling sound change, the change in the transmission characteristics of the canceling sound can be learned, and the first canceling estimation signal can be generated based on the learned result thereof. Accordingly, the noise at the head position of the occupant can be reduced more effectively.

In the above aspect, preferably, the canceling sound output device and the error detector are installed in a headrest (6*a*) of an occupant seat (6) provided in the internal space, and the controller is configured to generate the second canceling estimation signal by adjusting only the time delay and the amplitude of the first canceling estimation signal.

According to this aspect, the canceling sound output device, the error detector, and the head of the occupant can be sufficiently close to each other. Accordingly, most of the canceling sound reaches the error detector and the head of the occupant directly from the canceling sound output device, so that the dependence of the canceling sound on the time delay and the distance attenuation can be increased. Accordingly, by adjusting only the time delay and the amplitude of the first canceling estimation signal, the second canceling estimation signal can be generated with high accuracy.

Thus, according to the above aspects, it is possible to provide an inexpensive active noise reduction system that can effectively reduce the noise at a head position of an occupant even if the head position of the occupant changes.

BRIEF DESCRIPTION OF THE DRAWING(S)

FIG. 6 shows a correction coefficient table according to the second embodiment.

DETAILED DESCRIPTION OF THE INVENTION

Figure 1:
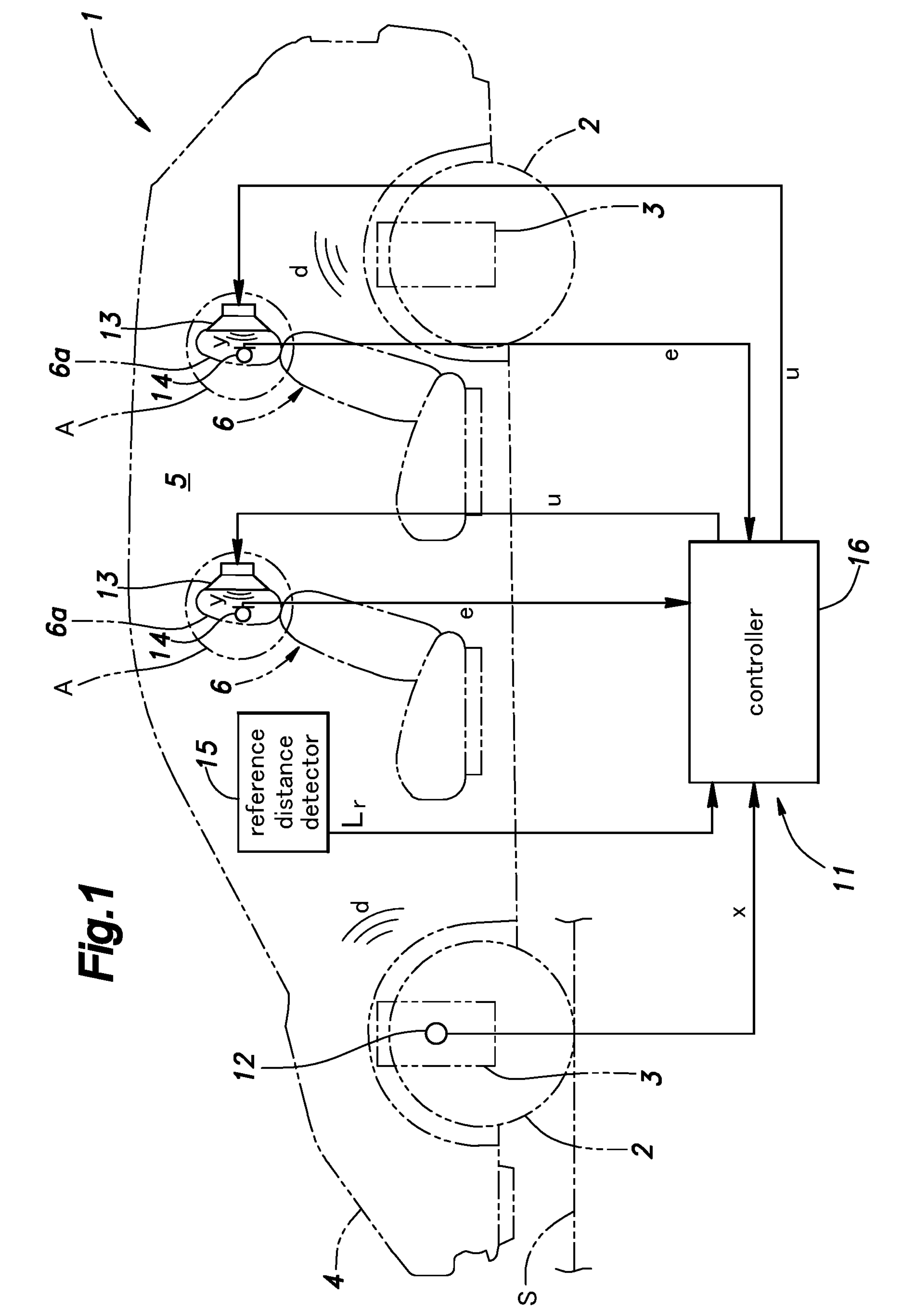
FIG. 1 is a schematic diagram showing a vehicle to which an active noise reduction system according to the first embodiment is applied.

In the following, embodiments of the present invention will be described with reference to the drawings. In this specification, "ˆ" (circumflexes) shown together with symbols each indicate an identification value or an estimation value. "ˆ" are shown above the symbols in the drawings and formulas, but are shown subsequently to the symbols in the text of the description.

The First Embodiment

First, the first embodiment of the present invention will be described with reference to FIGS. 1 to 4.

<The Active Noise Reduction System 11>

FIG. 1 is a schematic diagram showing a vehicle 1 (an example of a mobile body) to which an active noise reduction system 11 (hereinafter abbreviated as "noise reduction system 11") according to the first embodiment is applied. When wheels 2 vibrate due to the force received from a road surface S and the vibration of the wheels 2 are transmitted to a vehicle body 4 via suspensions 3, a road noise d is generated in a vehicle cabin 5 (an example of an internal space of the mobile body). The noise reduction system 11 according to the first embodiment is a feedback-controllable active noise control device (ANC device) for reducing such a road noise d. More specifically, the noise reduction system 11 reduces the road noise d by generating a canceling sound y that is in an opposite phase to the road noise d and causing the generated canceling sound y to interfere with the road noise d. In another embodiment, the noise reduction system 11 may reduce a noise (for example, an aerodynamic noise transmitted from an undercover attached to a lower surface of the vehicle body 4) other than the road noise d generated as the vehicle 1 travels.

Figure 2:
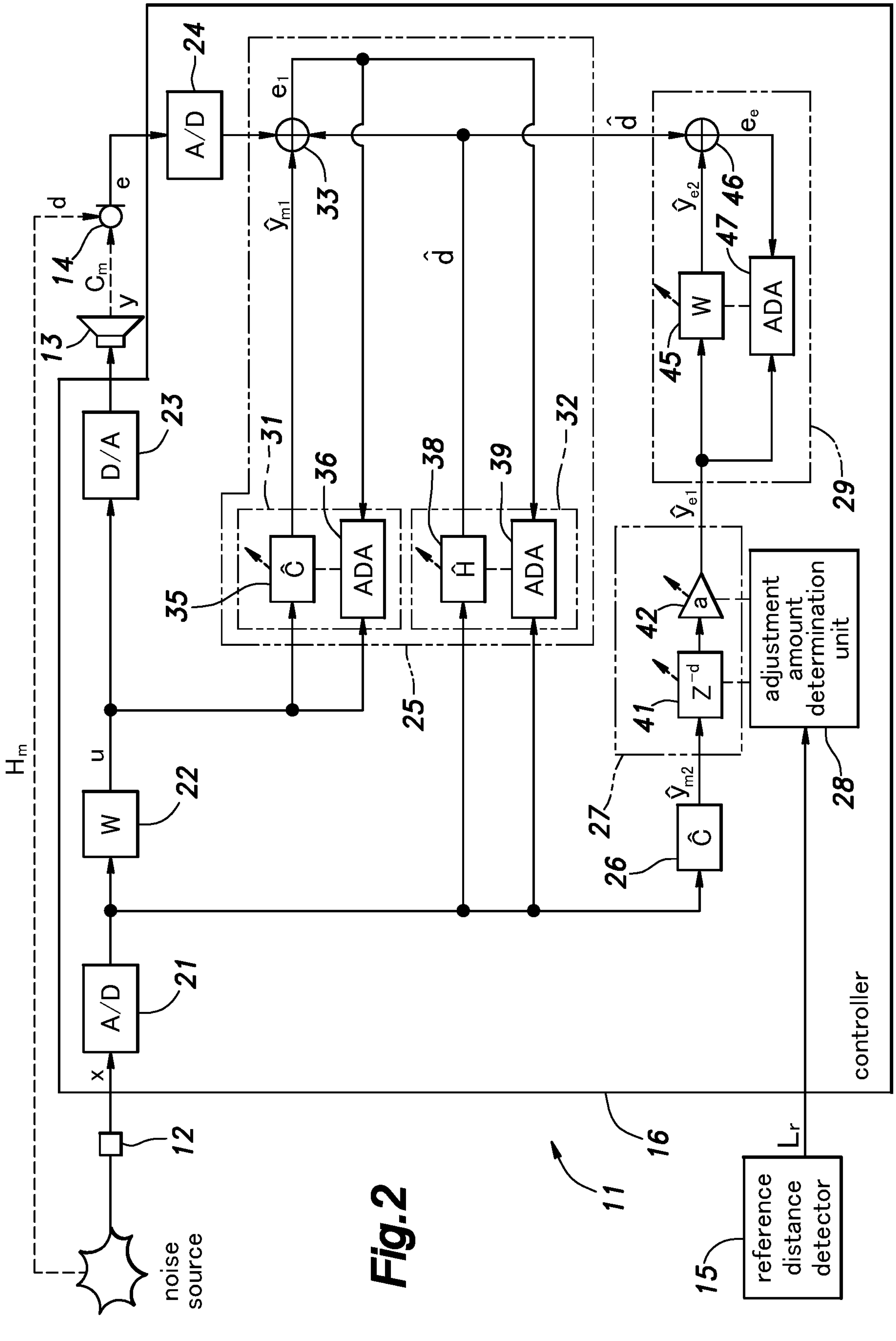
FIG. 2 is a functional block diagram showing an active noise reduction system according to the first embodiment.

With reference to FIGS. 1 and 2, the noise reduction system 11 includes a vibration sensor 12 (an example of a reference signal generator) configured to generate a reference signal x corresponding to the road noise d, a plurality of speakers 13 (an example of a canceling sound output device) configured to generate the canceling sound y for canceling the road noise d, a plurality of error microphones 14 (an example of an error detector) configured to detect an error (synthetic sound) between the road noise d and the canceling sound y and generate an error signal e corresponding to the detected error, a reference distance detector 15 configured to detect a distance (hereinafter referred to as "reference distance $L_r$") from the plurality of speakers 13 to a head position of an occupant, and a controller 16 configured to control the plurality of speakers 13 based on the reference signal x, the error signal e, and the reference distance $L_r$.

A symbol $H_m$ in FIG. 2 indicates transfer characteristics of the road noise d (transfer characteristics of a primary path) from a noise source (in the present embodiment, the road surface S) to each error microphone 14. A symbol $C_m$ in FIG. 2 indicates transfer characteristics of the canceling sound y (transfer characteristics of a secondary path) from the speaker 13 to each error microphone 14.

<The Vibration Sensor 12>

With reference to FIG. 1, the vibration sensor 12 of the noise reduction system 11 is installed in at least one suspension 3, for example. The vibration sensor 12 detects the acceleration of the suspension 3 according to the road noise d and generates the reference signal x according to the acceleration of the suspension 3. In another embodiment, the vibration sensor 12 may be installed in a location other than the suspension 3 of the vehicle 1. In another embodiment, a reference microphone (not shown) may generate the reference signal x according to the road noise d.

<The Speakers 13>

Each speaker 13 of the noise reduction system 11 is installed, for example, in a headrest 6*a* of an occupant seat 6 provided in the vehicle cabin 5. In another embodiment, the speaker 13 may be installed in a location other than the headrest 6*a* of the occupant seat 6.

<The Error Microphones 14>

Each error microphone 14 of the noise reduction system 11 is installed, for example, in the headrest 6*a* of the occupant seat 6. In another embodiment, the error microphone 14 may be installed in a location other than the headrest 6*a* of the occupant seat 6.

<The Reference Distance Detector 15>

The reference distance detector 15 of the noise reduction system 11 consists of, for example, an occupant monitoring system including an occupant camera that captures an image of the occupant. The reference distance detector 15 detects the reference distance $L_r$ based on the image of the occupant captured by the occupant camera, and outputs the detected reference distance $L_r$ to the controller 16. In another embodiment, the reference distance detector 15 may consist of a distance sensor that directly detects the reference distance $L_r$.

<The Controller 16>

The controller 16 of the noise reduction system 11 consists of an electronic control unit (ECU) that includes an arithmetic processing unit (a processor such as CPU and MPU) and a storage device (memory such as ROM and RAM). The controller 16 may consist of one piece of hardware, or may consist of a unit composed of plural pieces of hardware.

With reference to FIG. 2, the controller 16 includes, as functional components, a first A/D conversion unit 21, a control signal output unit 22, a D/A conversion unit 23, a second A/D conversion unit 24, an acoustic characteristics update unit 25, a reference signal correction unit 26, an acoustic characteristics adjustment unit 27, an adjustment amount determination unit 28, and a control filter update unit 29. Symbols "ADA" in FIG. 2 indicate "adaptive".

<The First A/D Conversion Unit 21>

The first A/D conversion unit 21 of the controller 16 converts an analog reference signal x output from the vibration sensor 12 into a digital reference signal x, and outputs the digital reference signal x to the control signal output unit 22, the acoustic characteristics update unit 25, and the reference signal correction unit 26. Hereinafter, "reference signal x" without explanation indicates the reference signal x that has passed through the first A/D conversion unit 21.

<The Control Signal Output Unit 22>

The control signal output unit 22 of the controller 16 consists of a control filter W. A finite impulse response filter (FIR filter) is used for the control filter W. In another embodiment, a single-frequency adaptive notch filter (SAN filter) may be used for the control filter W. The control signal output unit 22 generates a control signal u by filtering the reference signal x by using the control filter W, and outputs the generated control signal u to the D/A conversion unit 23 and the acoustic characteristics update unit 25.

<The D/A Conversion Unit 23>

The D/A conversion unit 23 of the controller 16 converts a digital control signal u output from the control signal output unit 22 into an analog control signal u, and outputs the analog control signal u to the speaker 13. Thus, the speaker 13 generates the canceling sound y according to the control signal u.

<The Second A/D Conversion Unit 24>

The second A/D conversion unit 24 of the controller 16 converts the error signal e output from the error microphone 14 from an analog signal to a digital signal, and outputs the converted error signal e to the acoustic characteristics update unit 25. Hereinafter, "error signal e" without explanation indicates the error signal e that has passed through the second A/D conversion unit 24.

<The Acoustic Characteristics Update Unit 25>

The acoustic characteristics update unit 25 of the controller 16 updates an estimation value of the acoustic characteristics in the vehicle cabin 5 based on the reference signal x, the control signal u, and the error signal e. The acoustic characteristics update unit 25 includes a canceling estimation signal generation unit 31, a noise estimation signal generation unit 32, and an adder 33.

The canceling estimation signal generation unit 31 includes a secondary path filter unit 35 and a secondary path update unit 36.

The secondary path filter unit 35 consists of a secondary path filter C^. The secondary path filter C^ is a filter corresponding to an estimation value of the transfer characteristics $C_m$ of the canceling sound y from the speaker 13 to the error microphone 14. An FIR filter is used for the secondary path filter C^. In another embodiment, a SAN filter may be used for the secondary path filter C^.

The secondary path filter unit 35 generates a canceling estimation signal $y\hat{}_{m1}$ by filtering the control signal u using the secondary path filter C^. The canceling estimation signal $y\hat{}_{m1}$ is an estimation signal of the canceling sound y at a position of the error microphone 14 (hereinafter referred to as "microphone position"). The secondary path filter unit 35 outputs the generated canceling estimation signal $y\hat{}_{m1}$ to the adder 33.

The secondary path update unit 36 updates the secondary path filter C^ using an adaptive algorithm such as a Least Mean Square algorithm (LMS algorithm). More specifically, the secondary path update unit 36 updates the secondary path filter C^ such that a virtual error signal $e_1$ (that will be described later) output from the adder 33 is minimized.

The noise estimation signal generation unit 32 includes a primary path filter unit 38 and a primary path update unit 39.

The primary path filter unit 38 consists of a primary path filter H^. The primary path filter H^ is a filter corresponding to an estimation value of the transfer characteristics $H_m$ of the road noise d from the noise source to the error microphone 14. An FIR filter is used for the primary path filter H^. In another embodiment, a SAN filter may be used for the primary path filter H^.

The primary path filter unit 38 generates a noise estimation signal d^ by filtering the reference signal x using the primary path filter HA. The noise estimation signal d^functions as both an estimation signal of a road noise $d_m$ at the microphone position and an estimation signal of a road noise $d_e$ at the head position of the occupant. The primary path filter unit 38 outputs the generated noise estimation signal d^ to the adder 33 and the control filter update unit 29.

The primary path update unit 39 updates the primary path filter H^ using an adaptive algorithm such as the LMS algorithm. More specifically, the primary path update unit 39 updates the primary path filter H^ such that the virtual error signal $e_1$ (that will be described later) output from the adder 33 is minimized.

The adder 33 generates the virtual error signal $e_1$ by adding together the error signal e, the canceling estimation signal $y\hat{}_{m1}$, and the noise estimation signal d^. The adder 33 outputs the generated virtual error signal $e_1$ to the canceling estimation signal generation unit 31 and the noise estimation signal generation unit 32.

<The Reference Signal Correction Unit 26>

The reference signal correction unit 26 of the controller 16, like the canceling estimation signal generation unit 31, consists of the secondary path filter C^. When the secondary path filter C^ is updated in the canceling estimation signal generation unit 31, the updated secondary path filter C^ is output to the reference signal correction unit 26, and the secondary path filter C^ is updated in the reference signal correction unit 26. That is, the secondary path filter C^set in the reference signal correction unit 26 is not a fixed value but a value that is successively updated based on the signal from the canceling estimation signal generation unit 31.

The reference signal correction unit 26 generates a canceling estimation signal $y\hat{}_{m2}$ (first canceling estimation signal) by filtering the reference signal x. More specifically, the reference signal correction unit 26 generates the canceling estimation signal $y\hat{}_{m2}$ by correcting the reference signal x based on the updated secondary path filter $C\hat{}$. The canceling estimation signal $y\hat{}_{m2}$ is, like the canceling estimation signal $y\hat{}_{m1}$, an estimation signal of the canceling sound y at the microphone position. The reference signal correction unit 26 outputs the generated canceling estimation signal $y\hat{}_{m2}$ to the acoustic characteristics adjustment unit 27.

<The Acoustic Characteristics Adjustment Unit 27>

The acoustic characteristics adjustment unit 27 of the controller 16 generates a canceling estimation signal $y\hat{}_{e1}$ (an example of a second canceling estimation signal) by adjusting the time delay and the amplitude (distance attenuation) of the canceling estimation signal $y\hat{}_{m2}$. The canceling estimation signal $y\hat{}_{e1}$ is an estimation signal of the canceling sound y at the head position of the occupant. The acoustic characteristics adjustment unit 27 outputs the generated canceling estimation signal $y\hat{}_{e1}$ to the control filter update unit 29.

The acoustic characteristics adjustment unit 27 includes a delay unit 41 and an amplitude adjustment unit 42. The delay unit 41 adjusts the time delay of the canceling estimation signal $y\hat{}_{m2}$ by using delay characteristics $Z^{-d}$. More specifically, the delay unit 41 delays the canceling estimation signal $y\hat{}_{m2}$ by d samples. The amplitude adjustment unit 42 adjusts the amplitude of the canceling estimation signal $y\hat{}_{m2}$ by using an amplitude adjustment coefficient a. More specifically, the amplitude adjustment unit 42 adjusts the amplitude of the canceling estimation signal $y\hat{}_{m2}$ by multiplying the canceling estimation signal $y\hat{}_{m2}$ by the amplitude adjustment coefficient a.

<The Adjustment Amount Determination Unit 28>

The adjustment amount determination unit 28 of the controller 16 determines an adjustment amount of the time delay in the acoustic characteristics adjustment unit 27 based on the reference distance $L_r$ output from the reference distance detector 15. More specifically, the adjustment amount determination unit 28 determines the delay characteristics $Z^{-d}$ of the delay unit 41 according to the following formula (1). Incidentally, "round" in the following formula (1) indicates an operation for rounding off to an integer, "c" in the following formula (1) indicates the speed of sound, and "$F_S$" in the following formula (1) indicates a sampling frequency.

$$d = \mathrm{round}\left(\frac{L_r}{c} \times F_s\right) \tag{1}$$

The adjustment amount determination unit 28 determines the adjustment amount of the amplitude in the acoustic characteristics adjustment unit 27 based on the reference distance $L_r$ output from the reference distance detector 15. More specifically, the adjustment amount determination unit 28 determines the amplitude adjustment coefficient a of the amplitude adjustment unit 42 according to the following formula (2). Incidentally, "$L_m$" in the following formula (2) indicates the distance from one speaker 13 to the corresponding error microphone 14, N (N=1, 2, . . . ) in the following formula (2) indicates a parameter for adjusting the amplitude, and "σ" in the following formula (2) indicates an adjustment constant (a constant of a relatively small value to prevent the denominator on the right side of the following formula (2) from becoming zero and prevent the amplitude from becoming excessively large).

$$a = \left(\frac{L_m}{L_r + \sigma}\right)^N \tag{2}$$

As is clear from the above formula (2), the amplitude adjustment coefficient a is set to decrease as the reference distance $L_r$ increases.

<The Control Filter Update Unit 29>

The control filter update unit 29 of the controller 16 consists of the control filter W, like the control signal output unit 22. The control filter update unit 29 updates the control filter W based on the canceling estimation signal $y\hat{}_{e1}$ output from the acoustic characteristics adjustment unit 27. The control filter update unit 29 includes a control filter unit 45, an adder 46, and a control update unit 47.

The control filter unit 45 generates a canceling estimation signal $y\hat{}_{e2}$ by filtering the canceling estimation signal $y\hat{}_{e1}$ by using the control filter W. The canceling estimation signal $y\hat{}_{e2}$ is an estimation signal of the canceling sound y at the head position of the occupant, like the canceling estimation signal $y\hat{}_{e1}$. The canceling estimation signal $y\hat{}_{e2}$ can be expressed by the following formula (3).

$$\hat{y}_{e2} = aZ^{-d}x\hat{C}W = aZ^{-d}\hat{y}_{m1} \tag{3}$$

The adder 46 generates a virtual error signal ee by adding together the canceling estimation signal $y\hat{}_{e2}$ and the noise estimation signal $d\hat{}$. The adder 46 outputs the generated virtual error signal ee to the control update unit 47.

The control update unit 47 updates the control filter W by using an adaptive algorithm such as the LMS algorithm. More specifically, the control update unit 47 updates the control filter W such that the virtual error signal ee output from the adder 46 is minimized.

When the control filter W is updated in the control filter update unit 29 in this way, the updated control filter W is output to the control signal output unit 22, and the control filter W is updated in the control signal output unit 22. That is, the control filter W set in the control signal output unit 22 is not a fixed value but a value that is successively updated based on the signal from the control filter update unit 29.

<The Noise Reduction Mechanism and the Precondition>

Figure 3:
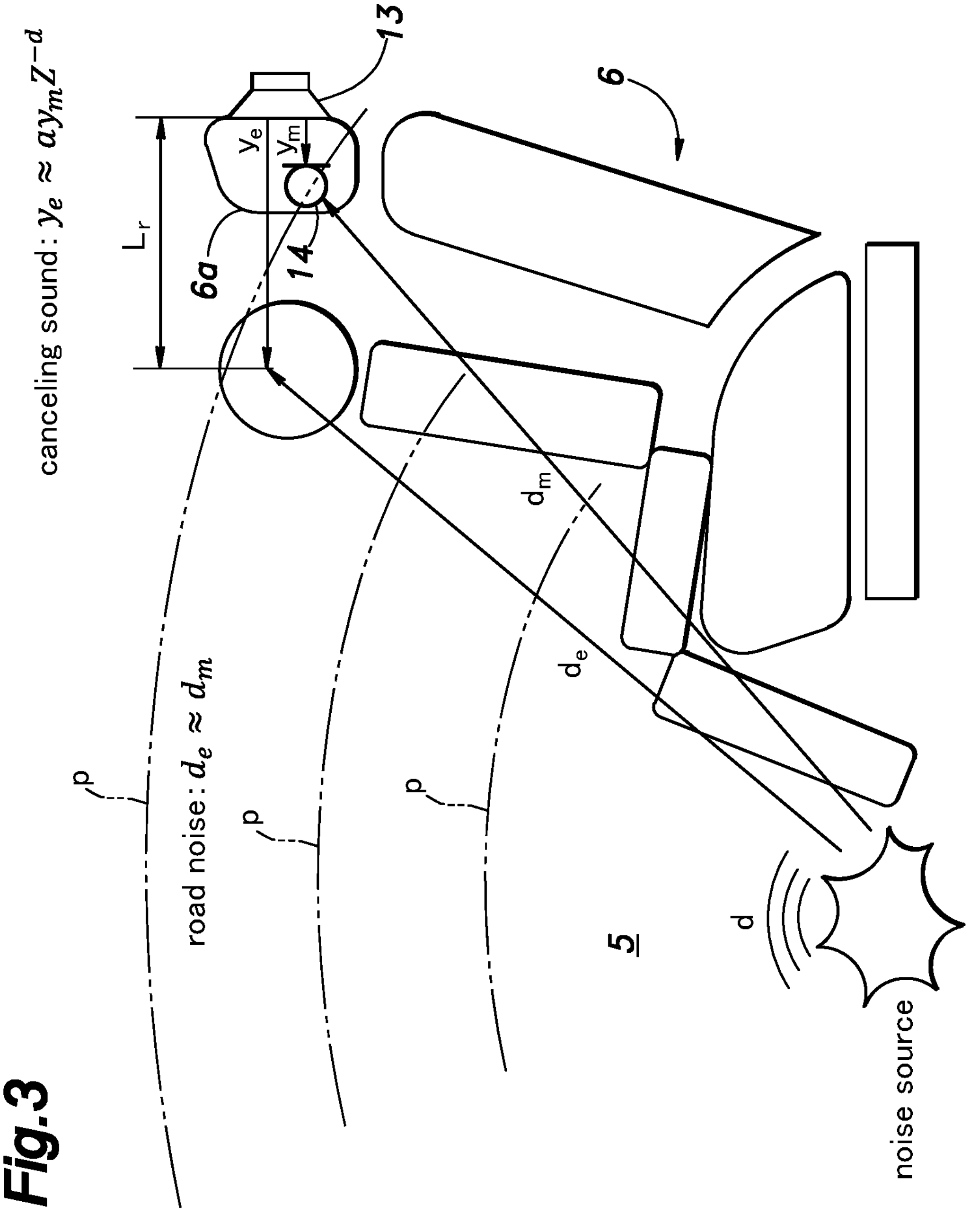
FIG. 3 is a schematic diagram showing a noise reduction mechanism and a precondition according to the first embodiment.

Next, a noise reduction mechanism and a precondition of the noise reduction system 11 will be described with reference to FIG. 3. Each of the curved lines p in FIG. 3 indicates a wave front of the road noise d (a surface where the sound pressure of the road noise d is uniform) transmitted from the noise source.

The head position of the occupant (for example, the driver) may change significantly in the front-and-rear direction depending on the driving posture of the occupant, but is unlikely to change in the up-and-down direction. Accordingly, in a case where each speaker 13 and the corresponding error microphone 14 are installed in the headrest 6*a* of the occupant seat 6, it is estimated that the head position of the occupant and the error microphone 14 are located at substantially the same height. The road noise d is transmitted in the vehicle cabin 5 from the feet of the occupant to the head thereof. Accordingly, if the head position of the occupant and the error microphone 14 are located at substantially the same height, it is estimated that the road noise $d_m$ at the microphone position and the road noise $d_e$ at the head position of the occupant are substantially equal. That is, the following formula (4) is satisfied with regard to the road noise d.

$$d_e \approx d_m \tag{4}$$

Since the above formula (4) is satisfied, the noise estimation signal d^can function as both the estimation signal of the road noise $d_m$ at the microphone position and the estimation signal of the road noise $d_e$ at the head position of the occupant.

By the way, in a case where each speaker 13 and the corresponding error microphone 14 are installed in the headrest 6*a* of the occupant seat 6, the reference distance $L_r$ may change significantly as the head position of the occupant changes significantly in the front-and-rear direction. Accordingly, the canceling sound $y_e$ at the head position of the occupant also changes significantly due to the influence of the time delay and the distance attenuation.

As such, the controller 16 generates the canceling estimation signal $\hat{y}_{e1}$ by adjusting the time delay and the amplitude (distance attenuation) of the canceling estimation signal $\hat{y}_{e2}$. In other words, the controller 16 estimates the canceling sound $y_e$ at the head position of the occupant by adjusting the time delay and the amplitude (distance attenuation) of the canceling sound $y_m$ at the microphone position. That is, the following formula (5) is satisfied with regard to the canceling sound y.

$$y_e \approx a y_m Z^{-d} \tag{5}$$

By adjusting the time delay and the amplitude (distance attenuation) of the canceling sound $y_m$ at the microphone position in this way, the canceling sound $y_e$ at the head position of the occupant can be estimated accurately. Accordingly, the road noise d at the head position of the occupant can be reduced effectively.

To use such a noise reduction mechanism, it is preferable that most of the canceling sound y reach directly from each speaker 13 to the corresponding error microphone 14 and the head position of the corresponding occupant so that the dependence of the canceling sound y on the time delay and the distance attenuation can be increased. That is, the precondition to use such a noise reduction mechanism is that each speaker 13, the corresponding error microphone 14, and the head position of the corresponding occupant are sufficiently close to each other.

The Effects of the First Embodiment

The controller 16 according to the first embodiment updates the primary path filter H^ and the secondary path filter C^based on the reference signal x and the error signal e. In other words, the controller 16 updates the estimation value of the acoustic characteristics of the internal space based on the reference signal x and the error signal e. Accordingly, even if the acoustic characteristics of the internal space change according to the displacement of each error microphone 14, the characteristics of the control filter W can be changed to follow the change in the acoustic characteristics. Accordingly, the error microphone 14 can be arranged on a movable portion such as the headrest 6*a*, and thus located closer to the head position of the occupant.

By the way, the area where the control effect (sound reduction effect) of the noise reduction system 11 is high is limited to an area around each error microphone 14 (see circles A in FIG. 1). Accordingly, when the head of the occupant moves away from the error microphone 14 due to the driving posture of the occupant, the control effect of the noise reduction system 11 that the occupant can feel may decrease.

As such, the controller 16 generates the canceling estimation signal $\hat{y}_{e1}$ (the estimation signal of the canceling sound y at the head position of the occupant) by adjusting the time delay and the amplitude of the canceling estimation signal $\hat{y}_{e2}$ (the estimation signal of the canceling sound y at the microphone position) based on the reference distance $L_r$, and updates the control filter W based on the canceling estimation signal $\hat{y}_{e1}$. Thus, the characteristics of the control filter W can be changed so as to follow the change in the head position of the occupant. Accordingly, in a case where the head of the occupant moves away from the error microphone 14, it is possible to suppress the decrease in the control effect of the noise reduction system 11 that the occupant can feel.

By the way, when a broadband noise is to be reduced, the noise reduction system 11 may generate the canceling estimation signal $\hat{y}_{e1}$ by filtering the canceling estimation signal $\hat{y}_{e2}$ by an FIR filter. However, if the canceling estimation signal $\hat{y}_{e1}$ is generated by using an FIR filter in this way, the calculation load of the controller 16 for generating the canceling estimation signal $\hat{y}_{e1}$ becomes large.

As such, the controller 16 generates the canceling estimation signal $\hat{y}_{e1}$ by adjusting only the delay characteristics $Z^{-d}$ and the amplitude adjustment coefficient a of the canceling estimation signal $\hat{y}_{e2}$. Accordingly, it is not necessary to use an FIR filter to generate the canceling estimation signal $\hat{y}_{e1}$ even when a broadband noise is to be reduced. Accordingly, the calculation load of the controller 16 for generating the canceling estimation signal $\hat{y}_{e1}$ can be greatly reduced when a broadband noise is to be reduced.

Figure 4:
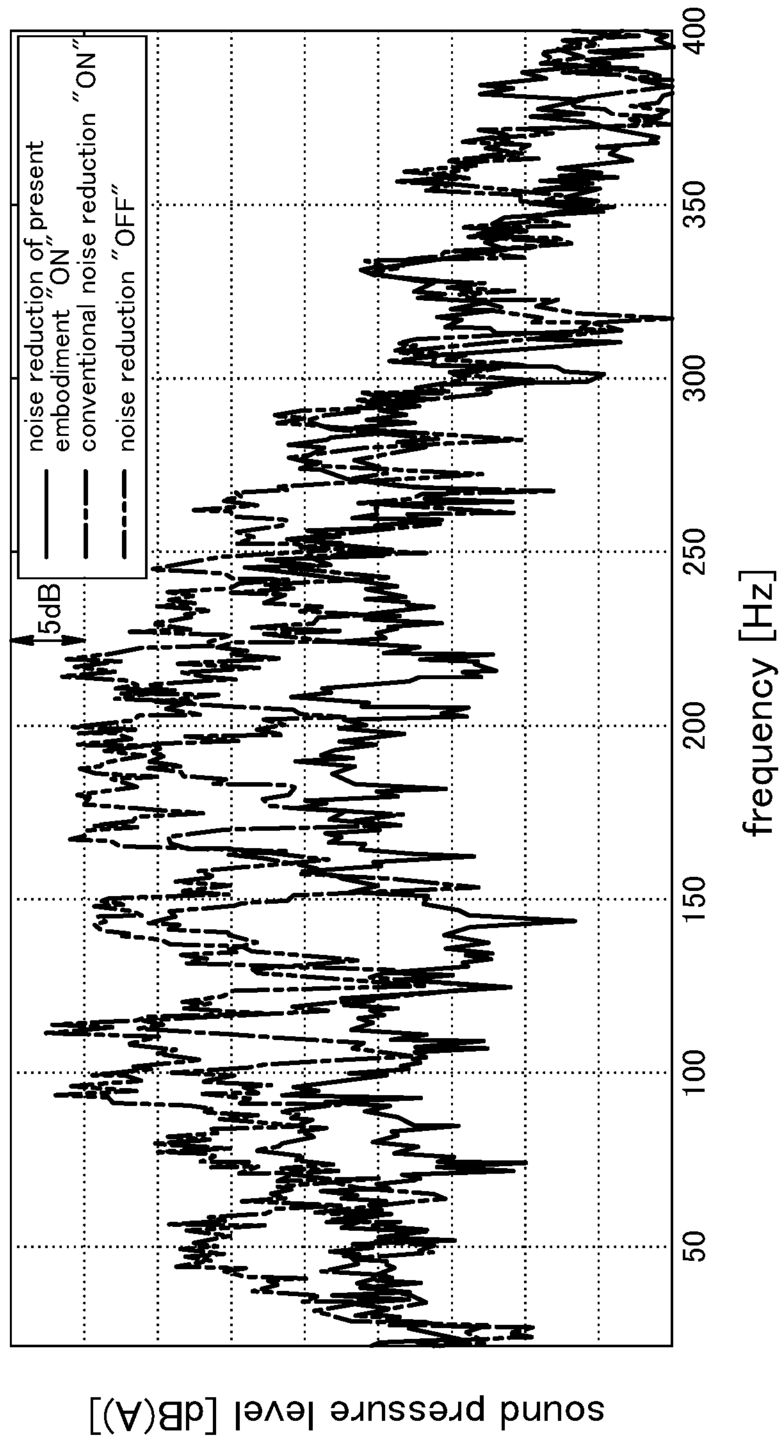
FIG. 4 is a graph showing an effect of reducing a road noise.

FIG. 4 is a graph showing the effect of reducing the road noise d at the head position of the occupant (more specifically, the ear position of the occupant). As shown in FIG. 4, when the noise reduction of the present embodiment (that is, the noise reduction system 11 that updates the control filter W based on the head position of the occupant) is ON, the road noise d can be reduced in a wide frequency band as compared with a case where the conventional noise reduction (that is, the noise reduction system that updates the control filter W without considering the head position of the occupant) is ON and a case where the noise reduction is OFF.

The Modification of the First Embodiment

In the first embodiment, the controller 16 adjusts only the delay characteristics $Z^{-d}$ and the amplitude adjustment coefficient a of the canceling estimation signal $\hat{y}_{e2}$. In a case where the abovementioned precondition of the noise reduction mechanism (the precondition that the speaker 13, the corresponding error microphone 14, and the head position of the corresponding occupant are sufficiently close) is unlikely to be satisfied, the controller 16 may adjust not only the delay characteristics $Z^{-d}$ and the amplitude adjustment coefficient a of the canceling estimation signal $\hat{y}_{e2}$ but also other parameters thereof.

The Second Embodiment

Next, the second embodiment of the present invention will be described with reference to FIGS. 5 and 6. Explanations that overlap with those of the first embodiment of the present invention will be omitted as appropriate.

<The Active Noise Reduction System 51>

Figure 5:
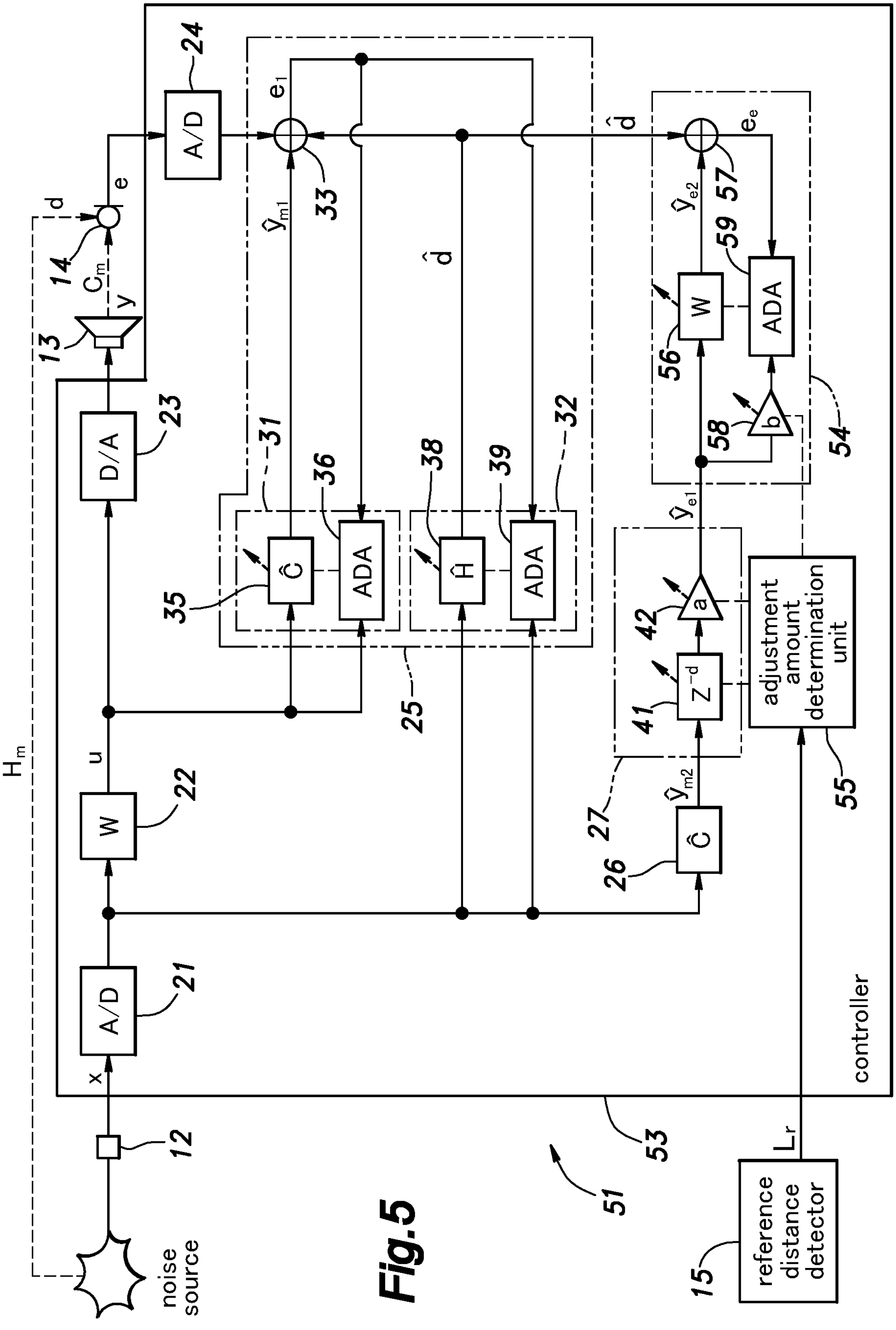
FIG. 5 is a functional block diagram showing an active noise reduction system according to the second embodiment.

FIG. 5 is a functional block diagram showing an active noise reduction system 51 (hereinafter abbreviated as "noise reduction system 51") according to the second embodiment. The components of the noise reduction system 51 other than a control filter update unit 54 and an adjustment amount determination unit 55 of the controller 53 are the same as those of the noise reduction system 11 according to the first embodiment. Accordingly, descriptions of these components will be omitted. Symbols "ADA" in FIG. 5 indicate "adaptive".

<The Control Filter Update Unit 54>

The control filter update unit 54 of the controller 53 includes a control filter unit 56, an adder 57, an estimation signal correction unit 58, and a control update unit 59. The configurations of the control filter unit 56 and the adder 57 of the control filter update unit 54 are the same as those of the control filter unit 45 and the adder 46 of the control filter update unit 29 according to the first embodiment. Accordingly, descriptions of these components will be omitted.

The estimation signal correction unit 58 corrects the canceling estimation signal $\hat{y}_{e1}$ by using a correction coefficient b. The estimation signal correction unit 58 outputs the corrected canceling estimation signal $\hat{y}_{e1}$ to the control update unit 59.

The control update unit 59 updates the control filter W by using an adaptive algorithm such as the LMS algorithm. More specifically, the control update unit 59 updates the control filter W such that the virtual error signal ee output from the adder 57 is minimized. For example, the control update unit 59 updates the control filter W according to the following formula (6). Incidentally, "μ" in the following formula (6) indicates a step size parameter.

$$W(n+1)=W(n)-b\mu\hat{e}_e(n)(r^*aZ^{-d}\hat{C}) \quad (6)$$

As is clear from the above formula (6), the control update unit 59 corrects the update amount of the control filter W by multiplying the update amount $(\mu\hat{e}_e(n)(r^*aZ^{-d}\hat{C}))$ of the control filter W by the correction coefficient b.

<The Adjustment Amount Determination Unit 55>

The adjustment amount determination unit 55 of the controller 53 sets the correction coefficient b based on the reference distance $L_r$ output from the reference distance detector 15. Hereinafter, setting methods of the correction coefficient b by the adjustment amount determination unit 55 will be described.

<The Setting Method 1 of the Correction Coefficient b>

When the amplitude adjustment coefficient a decreases as the reference distance $L_r$ increases, the update amount of the control filter W also decreases. If the update amount of the control filter W decreases excessively, the update performance (learning speed) of the control filter W may deteriorate.

As such, the adjustment amount determination unit 55 sets the correction coefficient b to a reciprocal of the amplitude adjustment coefficient a in order to reduce the dependence of the update amount of the control filter W on the amplitude adjustment coefficient a. Accordingly, the correction coefficient b can be increased in a case where the amplitude adjustment coefficient a decreases as the reference distance $L_r$ increases. Accordingly, the update amount of the control filter W can be prevented from decreasing excessively, so that the update performance of the control filter W can be maintained.

<The Setting Method 2 of the Correction Coefficient b>

When the reference distance $L_r$ increases, the abovementioned precondition of the noise reduction mechanism (the precondition that the speaker 13, the corresponding error microphone 14, and the head position of the corresponding occupant are sufficiently close) may not be satisfied. Accordingly, the update accuracy of the control filter W may deteriorate.

As such, the adjustment amount determination unit 55 sets the correction coefficient b such that the product of the amplitude adjustment coefficient a and the correction coefficient b is less than 1. Accordingly, in a case where the reference distance $L_r$ increases, the update amount of the control filter W can be prevented from increasing excessively. Accordingly, it is possible to avoid a situation in which the performance of the control filter W deteriorates due to the update of the control filter W.

<The Setting Method 3 of the Correction Coefficient b>

With reference to FIG. 6, the adjustment amount determination unit 55 stores a correction coefficient table T that defines the relationship between the reference distance $L_r$ and the correction coefficient b. The correction coefficient b is set such that the product of the amplitude adjustment coefficient a and the correction coefficient b is less than 1, for example, similarly to the setting method 2 of the correction coefficient b.

The adjustment amount determination unit 55 sets the correction coefficient b by referring to the correction coefficient table T based on the reference distance $L_r$. By using the correction coefficient table T in this way, the correction coefficient b can be freely set according to the reference distance $L_r$, so that the degree of freedom in setting the correction coefficient b can be increased.

The Effect of the Second Embodiment

The controller 53 according to the second embodiment sets the correction coefficient b corresponding to the reference distance $L_r$, and corrects the update amount of the control filter W by multiplying the update amount of the control filter W by the correction coefficient b. Accordingly, the update amount of the control filter W can be adjusted according to the reference distance $L_r$, and thus maintained at an appropriate value.

Concrete embodiments of the present invention have been described in the foregoing, but the present invention should not be limited by the foregoing embodiments and various modifications and alterations are possible within the scope of the present invention.

The invention claimed is:

1. An active noise reduction system for reducing a noise in an internal space of a mobile body, the active noise reduction system comprising:

a reference signal generator configured to generate a reference signal corresponding to the noise;

a canceling sound output device configured to output a canceling sound for canceling the noise;

an error detector configured to detect an error between the noise and the canceling sound and generate an error signal corresponding to the error;

a reference distance detector configured to detect a reference distance that is a distance from the canceling sound output device to a head position of an occupant; and a controller configured to control the canceling sound output device based on the reference signal, the error signal, and the reference distance, wherein the controller is configured to:

generate a first canceling estimation signal based on the reference signal, the first canceling estimation signal being an estimation signal of the canceling sound at a position of the error detector;

generate a second canceling estimation signal by adjusting a time delay and an amplitude of the first canceling estimation signal based on the reference distance, the second canceling estimation signal being an estimation signal of the canceling sound at the head position of the occupant; and update a control filter based on the second canceling estimation signal, the control filter being a filter for controlling the canceling sound output device.

2. The active noise reduction system according to claim 1, wherein the controller is configured to:

set a correction coefficient corresponding to the reference distance; and correct an update amount of the control filter by multiplying the update amount of the control filter by the correction coefficient.

3. The active noise reduction system according to claim 2, wherein the controller is configured to adjust the amplitude of the first canceling estimation signal by using an amplitude adjustment coefficient that decreases as the reference distance increases, and the correction coefficient is set to a reciprocal of the amplitude adjustment coefficient.

4. The active noise reduction system according to claim 2, wherein the controller is configured to adjust the amplitude of the first canceling estimation signal by using an amplitude adjustment coefficient that decreases as the reference distance increases, and the correction coefficient is set such that a product of the amplitude adjustment coefficient and the correction coefficient is less than 1.

5. The active noise reduction system according to claim 2, wherein the controller is configured to store a correction coefficient table that defines a relationship between the reference distance and the correction coefficient.

6. The active noise reduction system according to claim 1, wherein the controller is configured to:

update an estimation value of transmission characteristics of the canceling sound; and generate the first canceling estimation signal by correcting the reference signal based on the updated estimation value of the transmission characteristics of the canceling sound.

7. The active noise reduction system according to claim 1, wherein the canceling sound output device and the error detector are installed in a headrest of an occupant seat provided in the internal space, and the controller is configured to generate the second canceling estimation signal by adjusting only the time delay and the amplitude of the first canceling estimation signal.

* * * * *